United States Patent [19]

Mackay et al.

[11] 4,328,249

[45] May 4, 1982

[54] METHOD FOR TREATING GUM BASE TO IMPROVE SHELF-LIFE WITHOUT NEED FOR ANTIOXIDANTS

[75] Inventors: Donald A. M. Mackay, Pleasantville; Wayne J. Puglia, Bellerose Village, both of N.Y.

[73] Assignee: Life Savers, Inc., New York, N.Y.

[21] Appl. No.: 229,803

[22] Filed: Jan. 30, 1981

[51] Int. Cl.³ .............................................. A23G 3/30
[52] U.S. Cl. ........................................ 426/3; 426/474; 426/475
[58] Field of Search ........................................ 426/3-6, 426/312, 474, 475

[56] References Cited

U.S. PATENT DOCUMENTS

| | | | |
|---|---|---|---|
| 1,418,457 | 6/1922 | Owen | 426/475 |
| 3,615,727 | 10/1971 | Starke | 426/312 |
| 3,985,902 | 10/1976 | Coste | 426/474 |
| 4,202,906 | 5/1980 | Ogawa et al. | 426/6 |
| 4,206,301 | 6/1980 | Yolles | 426/6 |
| 4,259,360 | 3/1981 | Venetucci et al. | 426/475 |

*Primary Examiner*—Jeanette M. Hunter
*Attorney, Agent, or Firm*—Richard Kornutik

[57] ABSTRACT

A method is provided for treating gum base to improve its resistance to oxidation without the need for antioxidants wherein air or oxygen is swept from the gum base by means of an inert gas, and the oxygen-free gum base, in particulate form, is coated with a highly oxygenated substance, such as molten sugar, sorbitol solution or hydrogenated starch hydrolysate which acts as a barrier against oxygen.

The gum base produced by the above method and chewing gum containing such gum base are also provided.

12 Claims, No Drawings

METHOD FOR TREATING GUM BASE TO IMPROVE SHELF-LIFE WITHOUT NEED FOR ANTIOXIDANTS

FIELD OF THE INVENTION

The present invention relates to a method for treating gum base to impart oxidation resistance thereto without the use of antioxidants, to gum base produced thereby, and to chewing gum containing such gum base.

BACKGROUND OF THE INVENTION

Today, the consuming public is becoming ever more concerned about the use of preservatives in foods, confections and beverages. These preservatives fall into the category of chemical antioxidants and include butylated hydroxytoluene and butylated hydroxyanisole which have been used in gum bases and chewing gum containing same. Accordingly, a method for producing gum base or a food item, confection or beverage of increased storage life which method has decreased dependence on chemical antioxidants would be a long-awaited advance in the food preservation art.

DESCRIPTION OF THE INVENTION

In accordance with the present invention, a method is provided for treating gum base to improve its resistance to oxidation and thereby improve its shelf-life without the need for use of substantially any antioxidants. The method of the present invention includes the steps of melting gum base, applying a vacuum to the molten gum base to withdraw gases therefrom, removing the vacuum and introducing an inert gas into contact with the gum base, and reapplying the vacuum using the inert gas to help sweep out any traces of air or oxygen remaining absorbed in the gum base after the first vacuum application.

The so-treated gum base is found to be remarkably stable and requires no or little antioxidant to prevent reabsorption of oxygen.

In a preferred embodiment, to insure prevention of oxygen reabsorption by the gum base, the gum base is ground into fine particles which are coated with a highly oxygenated substance like molten sugar in the case where the gum base is to be used in a sugar containing chewing gum or a polyol, such as sorbitol, mannitol, xylitol or glycerol, or hydrogenated starch hydrolysate in the case where the gum base is to be used in a sugarless (or sugar-containing) chewing gum.

While moisture keeping qualities of product made with polyols, such as glycerin, sorbitol and the like or substances containing sorbitol, such as hydrogenated starch hydrolysate have been known on account of the hygroscopic nature of polyols, the use of highly oxygenated substances like polyols as a barrier to atmospheric oxygen has heretofore never been employed in the chewing gum making art, especially when combined with degassing techniques and with the use of no or only minimal amounts of antioxidants.

Further in accordance with the present invention, chewing gum having an extended shelf-life is provided which when prepared by the method as outlined above includes no, or only minimal amounts, say less than about 0.05% of antioxidant in the gum base. As indicated, such chewing gum may be of the sugar containing or sugarless variety.

In making the gum base of the invention having no or substantially reduced amounts of antioxidants but still having improved shelf-life, the starting gum base, which may be of conventional composition as described below, is introduced into a mixing kettle and is first melted and maintained in a molten state, but at a temperature of less than about 240° F., and preferably less than about 190° F., at which time a vacuum of from about 20 to about 29 in. Hg, and preferably of from about 27 to about 29 in. Hg, is applied to the gum base to withdraw gases including air and oxygen therefrom. Thereafter, the vacuum is removed and the inert gas, such as nitrogen, carbon dioxide, helium or argon is flowed into the kettle under a pressure of 1 to about 5 psi, and preferably from about 2 to about 4 psi and the vacuum is reapplied (from about 20 to about 29 in. Hg, preferably from about 27 to about 29 in. Hg) causing the inert gas to sweep away remaining air and oxygen absorbed in the gum base. This process is repeated two additional times.

The gum base is then ready for use in making chewing gum.

In a preferred embodiment of the method of this invention, in order to inhibit the reabsorption of oxygen, the gum base is ground into fine particles, for example, having an average particle size of from about 1000 microns to about 2500 microns, which particles are coated with a highly oxygenated substance which serves as a barrier against oxygen, such as coated with molten sugar or, if destined for use in sugarless gum, with liquid sorbitol, glycerin or hydrogenated starch hydrolysate, and the so-coated gum base is then mixed with other chewing gum ingredients to form the chewing gum of the invention.

Alternatively, to inhibit oxygen reabsorption during the gum making procedure, the gum base added to chewing gum mixing apparatus is blanketed with a layer of inert gas as described above, and such blanket is maintained while chewing gum ingredients are mixed with the gum base and throughout the entire chewing gum making procedure.

The gum base treated in accordance with the invention will be relatively water-insoluble, water-impenetrable and will be present in the chewing gum of the invention in an amount ranging from about 8 to about 50%, and preferably from about 15 to about 40% by weight of the chewing gum composition.

In general, the gum base will include natural gum, synthetic resins, waxes, plasticizers, etc., in a manner well known in the art. Typical examples of the ingredients which may be present in the chewing gum base of the invention are masticatory substances of vegetable origin, such as chicle, crown gum, nispero, rosidinha, jelutong, pendare, perillo, niger gutta, tunu, etc., masticatory substances of synthetic origin, such as butadienestyrene copolymer, isobutylene-isoprene copolymer, petroleum wax, polyethylene, polyisobutylene, polyvinylacetate, etc., plasticizers, such as lanolin, stearic acid, sodium stearate, potassium stearate, etc., antioxidants, such as butylated hydroxyanisole, butylated hydroxytoluene, and propyl gallate.

The water-insoluble gum base may consist of any of the various bases disclosed for example in U.S. Pat. Nos. 3,052,552 and 2,197,719.

The chewing gum of the invention will include a natural sugar and/or non-sugar or artificial sweetener.

The term "natural sugar" includes one or more sugars or sugar containing material, or sugar alcohols, for example, monosaccharides of 5 or 6 carbon atoms, such as arabinose, xylose, ribose, glucose, mannose, galactose, fructose, dextrose, or sorbose, or mixtures of two or more of the foregoing monosaccharides; disaccharides, for example, sucrose, such as cane or beet sugar, lactose, maltose or cellobiose; polysaccharides, such as partially hydrolyzed starch, dextrin or corn syrup solids, or sugar alcohols, such as sorbitol, xylitol, mannitol or arabitol, or hydrogenated starches or hydrogenated starch hydrolysates.

The hydrogenated starches also referred to as hydrogenated starch hydrolysates employed herein may include those disclosed in U.S. Pat. No. Re. 26,959 or U.S. Pat. No. 3,556,811 as well as various hydrogenated glucose syrups and/or powders which contain sorbitol, hydrogenated disaccharides, tri- to hexa-hydrogenated saccharides, and hydrogenated higher polysaccharides, or mixtures of any two or more of the above.

The hydrogenated glucose syrups and/or powders may be produced by catalytic hydrogenation of standard glucose syrups (acid and/or enzyme converted) to the point where all the glucose end groups of the saccharides are reduced to alcohols, that is, dextrose to sorbitol. In the case of hydrogenated glucose syrups, the total solids are made of from about 4 to about 20% sorbitol, from about 20 to about 65% hydrogenated disaccharides (that is, maltitol), from about 15 to about 45% tri- to hepta-hydrogenated saccharides, and from about 10 to about 35% hydrogenated saccharides higher than hepta.

Where the chewing gum of the invention contains a natural sugar, such as sucrose or a sugar alcohol or hydrogenated starch hydrolysate, such sweetener will be present in an amount of from about 0.05 to about 90% and preferably from about 30 to about 83% by weight of such portion.

In addition, as mentioned hereinbefore, the chewing gum of the invention may include artificial sweeteners, such as sodium, calcium or ammonium saccharin salts, dihydrochalcones, glycyrrhizin, dipotassium glycyrrhizin, glycyrrhizic acid ammonium salt, L-aspartyl-L-phenylalanine methyl ester, as well as *Stevia rebaudiana* (Stevioside), *Richardella dulcifica* (Miracle Berry) *Dioscoreophyllum cumminsii* (Serendipity Berry), cyclamate salts, and the like, or mixtures of any two or more of the above. The above sweeteners where present may be employed in an amount of from about 0.02 to about 2% and preferably from about 0.05 to about 1% by weight of each of said portions.

Flavors which may be added in forming the chewing gum of the invention comprise flavor oils, including acids, such as adipic, succinic and fumaric acid, citrus oils, such as lemon oil, orange oil, lime oil, grapefruit oil, fruit essences, such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the center fill.

The flavor will be present in an amount of at least about 0.3 to about 1.5% by weight.

The chewing gum of the invention may also contain conventional ester gums, polydextrose, fillers, such as, calcium carbonate, and texturizers, such as calcium carbonate, and texturizers, such as hydrated alumina, plasticizers, softeners or emulsifiers, such as lecithin, fatty acids, glycerine, glyceryl monostearate, hydrogenated vegetable oils, sorbitan monostearate, tallow, propylene glycol, F.D. and C. coloring agents, and other conventional chewing gum additives as will be apparent to those skilled in the art.

The following Examples illustrate preferred embodiments of the present invention without, however, limiting the same thereto. All temperatures are expressed in °F.

EXAMPLE 1

A gum base having the following formulation is treated in accordance with the method of the present invention to remove oxygen and air absorbed therein.

| Gum Base Composition | |
|---|---|
| Ingredient | Parts by Weight |
| Candelilla wax | 5 |
| Paraffin wax | 13 |
| Polyvinyl acetate | 22 |
| SBR copolymer | 9 |
| $CaCO_3$ | 20 |
| Stabelite ester No. 5 | 11 |
| Arochem | 7 |
| Hydrofol | 7 |
| Glyceryl monostearate | 6 |

The gum base is introduced into a standard kettle-mixer and melted at about 240° F. A vacuum of about 29 in. Hg is applied to the molten gum base to suck out air and oxygen from the gum base. After about 5 minutes, the vacuum is removed and nitrogen gas under a pressure of 3 psi is flowed into the kettle and the vacuum is reapplied at 29 in. Hg causing the nitrogen gas to sweep away remaining air and oxygen absorbed in the gum base. This process is repeated two additional times.

The so-treated gum base substantially free of air and oxygen is now ready for use in preparing sugar or sugarless chewing gum.

EXAMPLE 2

A chewing gum having a long shelf-life containing gum base treated in accordance with the present invention and which is substantially free of antioxidants is prepared as follows.

A long lasting cherry flavor chewing gum is prepared from the following ingredients:

| Ingredients | Parts by Weight |
|---|---|
| Gum base (from Ex. 1) | 20 |
| Sugar | 50 |
| Corn syrup | 16 |
| Dextrose | 10 |
| Lecithin | 0.2 |
| Citric acid | 0.5 |
| Fumaric acid (passes through a U.S. 140 mesh screen) | 2 |
| Artificial cherry flavor | 2.5 |
| Gum arabic coated cherry flavor | 0.6 |

The gum base from Example 1 is ground into fine particles having an average particle size of about 1700 microns. The gum base particles are then mixed with molten sugar to thereby coat the particles with sugar which acts as an oxygen barrier.

The sugar-coated gum base particles are then mixed with the remaining ingredients employing conventional gum making technology to form the chewing gum of the invention.

The so-formed chewing gum is found to be pleasant tasting and have an excellent shelf-life even without the presence of antioxidants therein.

EXAMPLE 3

A sugarless chewing gum having a long shelf-life containing gum base treated in accordance with the present invention and which is substantially free of antioxidants is prepared as follows.

A long lasting spearmint flavor chewing gum is prepared from the following ingredients:

| Ingredients | Parts by Weight |
| --- | --- |
| Gum base (from Ex. 1) | 30 |
| Sorbitol powder | 40 |
| Sorbitol syrup | 12 |
| Mannitol | 15 |
| Lecithin | 1 |
| Spearmint oil | 1 |
| Color | 0.1 |

The gum base from Example 1 is ground into fine particles having an average particle size of about 1700 microns. The gum base particles are then mixed with sorbitol syrup to thereby coat the particles with sorbitol which acts as an oxygen barrier.

The sorbitol-coated gum base particles are then mixed with the remaining ingredients employing conventional gum making technology to form the sugarless chewing gum of the invention.

The so-formed sugarless chewing gum is found to be pleasant tasting and have an excellent shelf-life even without the presence of antioxidants therein.

EXAMPLE 4

A sugarless peppermint chewing gum (having a long shelf-life containing gum base treated in accordance with the present invention and which is substantially free of antioxidants) is prepared from the following ingredients:

| Ingredients | Parts by Weight |
| --- | --- |
| Gum base (as prepared in Ex. 1) | 22 |
| Mannitol | 8 |
| Sorbitol powder | 8 |
| Sorbitol solution (70%) | 12 |
| Hydrogenated starch hydrolysate powder (78% solids, including 6% sorbitol and 56% maltitol) | 8 |
| Softener (lecithin) | 0.5 |
| Peppermint oil | 1.6 |
| Color | 0.05 |

The gum base from Example 1 is ground into fine particles having an average particle size of about 1700 microns. The gum base particles are then mixed with sorbitol syrup to thereby coat the particles with sorbitol which acts as an oxygen barrier.

The sorbitol coated gum base is heated (160°-175° F.) and placed in a pre-heated standard dough mixer equipped with sigma blades. Color is added and mixed for 3-4 minutes. About one-third of the hydrogenated starch hydrolysate powder is added and mixed for 1-3 minutes. Mannitol is added and mixed for 1-2 minutes. Thereafter, the sorbitol is slowly added followed immediately with lecithin and flavor and mixed for about 2-3 minutes. The remaining hydrogenated starch hydrolysate is added and the mixture mixed for 2-5 minutes.

The so-formed chewing gum is found to be pleasant tasting and have an excellent shelf-life even without the presence of antioxidants therein.

What is claimed is:

1. A method for treating gum base to improve its resistance to oxidation without the need for amounts of antioxidants normally employed, which comprises placing gum base in a confined area, heating the gum base at a temperature to melt the gum base, while the gum base is in a molten state applying a vacuum of from about 20 to about 29 in. Hg thereto to withdraw gases therefrom, removing the vacuum and introducing an inert gas under a pressure of 1 to about 5 psi into contact with the gum base and reapplying the vacuum thereby causing the inert gas to help sweep out air or oxygen remaining absorbed in the gum base after the first vacuum application.

2. The method as defined in claim 1 wherein said gum base is melted at from about 190° F. to about 240° F.

3. The method as defined in claim 1 wherein said inert gas is nitrogen, carbon dioxide, helium or argon.

4. The method as defined in claim 3 wherein said inert gas is introduced under a pressure of from about 2 to about 4 psi.

5. The method as defined in claim 1 wherein the gum base-inert gas is subjected to a vacuum of from about 20 to about 29 in. Hg.

6. The method as defined in claim 1 further including the step of grinding the gum base down to an average particle size of less than about 2500 microns and coating the particles of gum base with molten sugar, a polyol or a hydrogenated starch hydrolysate which serves as an oxygen barrier.

7. The method as defined in claim 6 wherein said gum base particles are coated with molten sugar.

8. The method as defined in claim 6 wherein said gum base particles are coated with a polyol.

9. The method as defined in claim 8 wherein said polyol is sorbitol, mannitol, xylitol or glycerin.

10. Chewing gum containing gum base treated as defined in claim 1.

11. Sugar-containing chewing gum containing gum base treated as defined in claim 7.

12. Sugarless chewing gum containing gum base treated as defined in claim 8.

* * * * *